(12) United States Patent
Lopez

(10) Patent No.: US 10,198,412 B2
(45) Date of Patent: Feb. 5, 2019

(54) SIMULATED ANNEALING TO PLACE ANNOTATIONS IN A DRAWING

(71) Applicant: Autodesk, Inc., San Rafael, CA (US)

(72) Inventor: Jorge Rafael Lopez, Jacksonville, FL (US)

(73) Assignee: AUTODESK, INC., San Rafael, CA (US)

( * ) Notice: Subject to any disclaimer, the term of this patent is extended or adjusted under 35 U.S.C. 154(b) by 141 days.

(21) Appl. No.: 15/065,590

(22) Filed: Mar. 9, 2016

(65) Prior Publication Data

US 2017/0262418 A1  Sep. 14, 2017

(51) Int. Cl.
*G06F 17/24* (2006.01)
*G06F 17/50* (2006.01)
*G06T 11/60* (2006.01)
*G06T 11/20* (2006.01)

(52) U.S. Cl.
CPC ........ *G06F 17/241* (2013.01); *G06F 17/5009* (2013.01); *G06T 11/203* (2013.01); *G06T 11/60* (2013.01); *G06T 2210/12* (2013.01)

(58) Field of Classification Search
None
See application file for complete search history.

(56) References Cited

U.S. PATENT DOCUMENTS

| | | | | |
|---|---|---|---|---|
| 5,724,072 A | * | 3/1998 | Freeman | G01C 21/3673 345/648 |
| 7,131,060 B1 | * | 10/2006 | Azuma | G06T 11/60 715/260 |
| 2006/0058949 A1 | * | 3/2006 | Fogel | G01C 21/32 345/629 |
| 2006/0082594 A1 | * | 4/2006 | Vafiadis | G06F 17/24 345/629 |
| 2006/0200759 A1 | * | 9/2006 | Agrawala | G06F 17/211 715/209 |
| 2011/0063328 A1 | * | 3/2011 | Herman | G06T 19/00 345/681 |

OTHER PUBLICATIONS

"Optimization by Simulated Annealing: A necessary and sufficient condition for convergence" by Bruce Hajek, downloaded from https://projecteuclid.org/download/pdf_1/euclid.lnms/1215540316 by using the Full-text: Open Access PDF File option on https://projecteuclid.org/euclid.lnms/1215540316 (Year: 1986).*

"Simulated annealing", Wikipedia, May 15, 2015. http://en.wikipedia.org/wiki/Simulated_annealing.

* cited by examiner

*Primary Examiner* — Stephen S Hong
*Assistant Examiner* — Sanchita Roy
(74) *Attorney, Agent, or Firm* — Gates & Cooper LLP

(57) ABSTRACT

A method, system, and computer program product provide the ability to optimize placement of annotations in a drawing model. A drawing model that has annotations and objects is acquired. An annotation (to be moved) is randomly selected. A new position for the selected annotation is randomly selected. The selected annotation is moved to the new position. A new quality score of a resulting drawing model is computed. The resulting drawing model is accepted or rejected based on the new quality score. The above steps are iterated, wherein over time, a probability of accepting the resulting drawing model based on a worse new quality score decreases. The final resulting drawing model is output (e.g., for display).

18 Claims, 8 Drawing Sheets

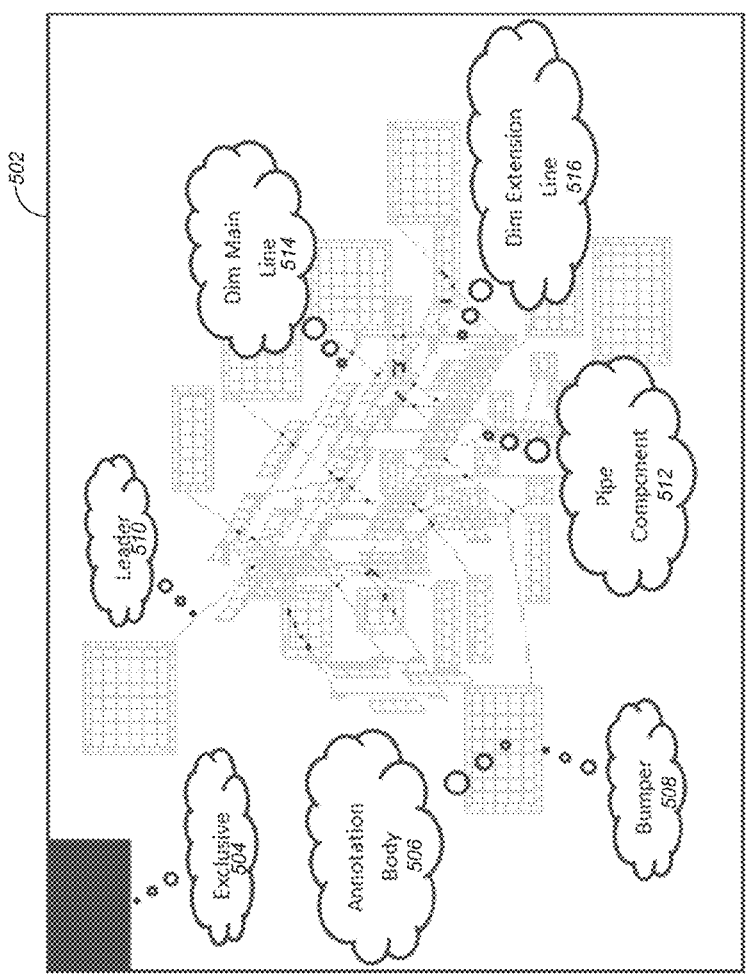
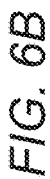
FIG. 5
FIG. 6A
FIG. 6B

SIMULATED ANNEALING TO PLACE ANNOTATIONS IN A DRAWING

BACKGROUND OF THE INVENTION

1. Field of the Invention

The present invention relates generally to computer drawings, and in particular, to a method, system, apparatus, and article of manufacture for placing annotations in a drawing using simulated annealing.

2. Description of the Related Art

Computer aided design (CAD)/drawing applications often create two-dimensional (2D) schematic documents/drawings of a three-dimensional (3D) model that may then be used for construction, installation, and other applications. Often times, 2D drawings contain geometry and numerous labels for such geometry (e.g., dimension labels, names, description, area, group, reference pipe network and structure, reference surface, identifying information, etc.). Labels need to be placed in a manner that creates a clean easily readable document. Unfortunately, prior art systems failed to provide a mechanism for placing labels that would result in a clean easily readable document. To better understand these problems, a description of prior art label placement systems may be useful.

Prior art label placement systems employ a greedy method to place annotations one at a time at an open location (e.g., that didn't collide with another label). Such a greedy method leads to space starvation for subsequently placed annotations/labels and needless intersections because the greedy system cannot move previously placed annotations. FIG. 1 illustrates the results of label placement using a greedy method in the prior art. As can be seen, labels 102, 104, 106, and 108 have leaders 110, 112, 114, and 116 (i.e., lines connecting the labels to the associated object/item in the drawing) respectively that intersect and create a cluttered view of the drawing 100.

As an example of the prior art, if one hundred (100) labels are to be placed in the drawing, the greedy method would go through each label and find an open location that didn't collide with other labels/leaders. However, as the labels are placed, there is no ability to move a previously placed label to find a better placement. Thus, the first ninety-nine (99) labels may not intersect and take up space, but trying to find a suitable location for the one-hundredth ($100^{th}$) label without moving the first ninety-nine (99) labels was not possible. In other words, as the label placement process continues from zero (0) to n labels, the placement of later labels is less and less optimal due to the consumption of available space by already placed labels.

SUMMARY OF THE INVENTION

Embodiments of the invention overcome the problems of the prior art by iterating through a process of moving annotations/labels using simulated annealing. An annotation is selected at random and moved to a random location selected from a set of pre-calculated locations. A determination is made regarding whether the new placement is an improvement for acceptance into the next iteration. The system continues to iterate placing different labels in different locations with the acceptance probability reducing based on a temperature as part of a simulated annealing process.

BRIEF DESCRIPTION OF THE DRAWINGS

Referring now to the drawings in which like reference numbers represent corresponding parts throughout:

FIG. 5 illustrates an example visualization of a 2D grid in accordance with one or more embodiments of the invention;

FIGS. 6A and 6b illustrate different annotation intersections/collisions in accordance with one or more embodiments of the invention;

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

Embodiments of the invention employ a simulated annealing probabilistic search method to find an acceptable label placement solution efficiently. At a high level, the simulated annealing search is provided an initial drawing model and it is allowed to iterate on this model accepting changes to the label placement that yield a better quality score for the model or accepting changes yielding worse quality scores based on the computation of a probability of acceptance that is determined by a scheduler.

Logical Flow

Figure 2:
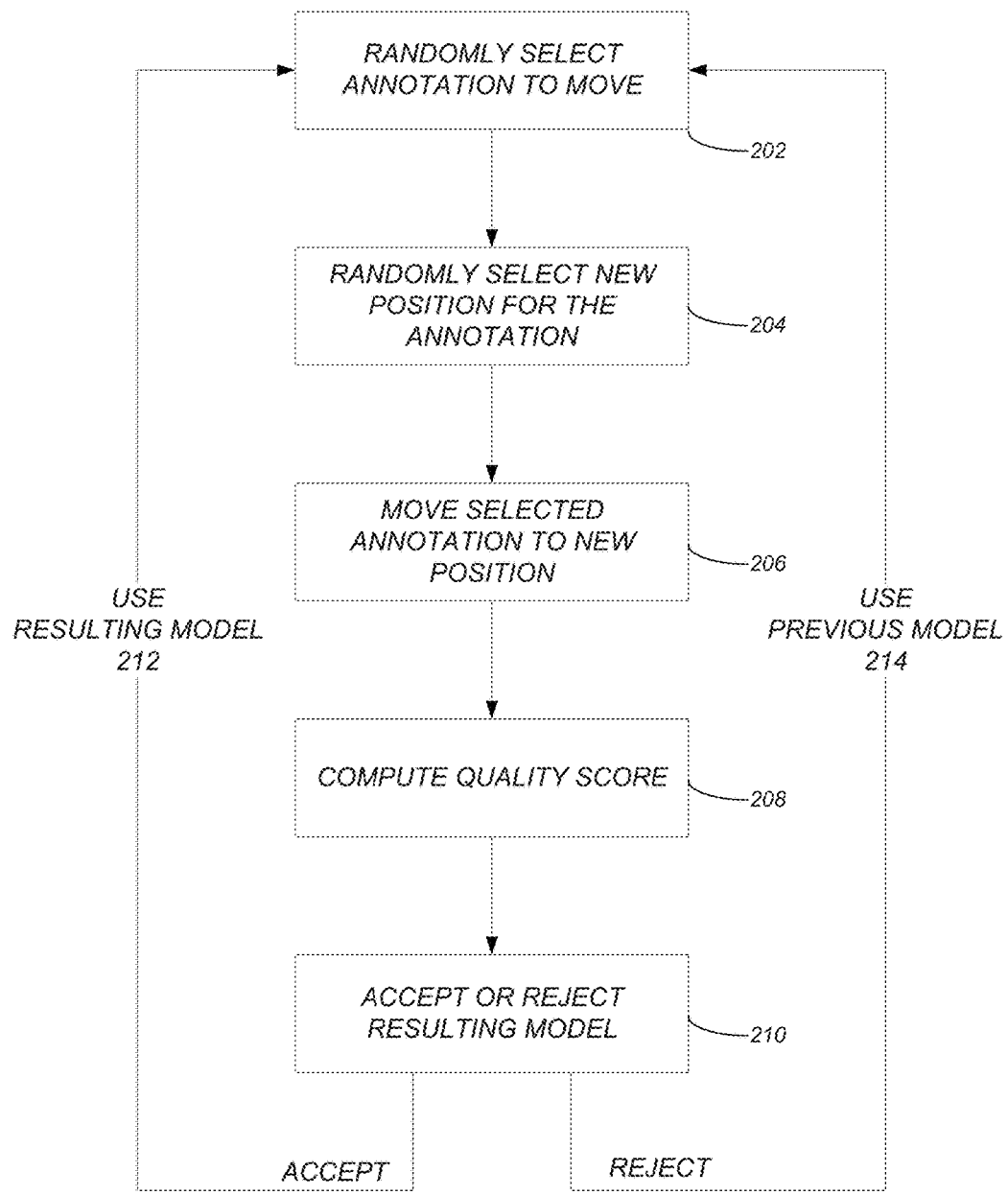
FIG. 2 illustrates the logical flow for placing annotations in a drawing in accordance with one or more embodiments of the invention.

FIG. 2 illustrates the logical flow for optimizing annotation placements in a drawing in accordance with one or more embodiments of the invention. More specifically, FIG. 2 illustrates the steps performed by each iteration of the annotation placement system.

At step 202, an annotation to move is randomly selected. This step may also include an application acquiring a two-dimensional (2D) drawing model that includes multiple annotations and objects.

At step 204, a new position for the selected annotation is randomly selected. The new position is selected from a pool of pre-computed positions.

At step 206, the selected annotation is moved to the new position.

At step 208, a new quality score of the resulting drawing model is computed.

At step 210, the resulting drawing model is accepted or rejected (e.g., based on the computed new quality score). Such a step may include outputting/displaying the resulting drawing model.

Steps 202-210 are then iterated such that over time, a probability of accepting the resulting drawing model based on a worse new quality score decreases. In addition, one or more embodiments of the invention may specify how many (e.g., the maximum number of) iterations of steps 202-210 are to be performed. In each iteration, a new annotation is selected (step 202), moved to a new location (step 206), a quality rating is computed (step 208), and a determination is made regarding whether to accept/reject the new location (step 210). In embodiments of the invention, in addition to (or instead of) a maximum number of iterations, the number of iterations and other properties used within steps 202-210 are based on a simulated annealing concept. In this regard, during early iterations, a worse solution/location for an annotation placement may be accepted. However, as the number of iterations increase, the likelihood of accepting a worse solution decreases.

Placement Positions

Step 204 of FIG. 2 provides the ability to randomly select the new position for the annotation. As stated above, the new position is selected from a pool of pre-computed positions. A number of different mechanisms may be used to generate the potential placement locations.

In one or more embodiments, for each annotation in the model, the application generates multiple positions that can be tried. The positions have a priority assigned to them that decreases as the distance increases from the anchor point of the annotation. This allows annotations closer to the point being annotated to be preferred over positions further away. In addition, one or more embodiments of the invention may include other preference criteria, for example angle of leader relative to the angle of the target object being annotated, in the computation of the priority for the position.

Figure 3:
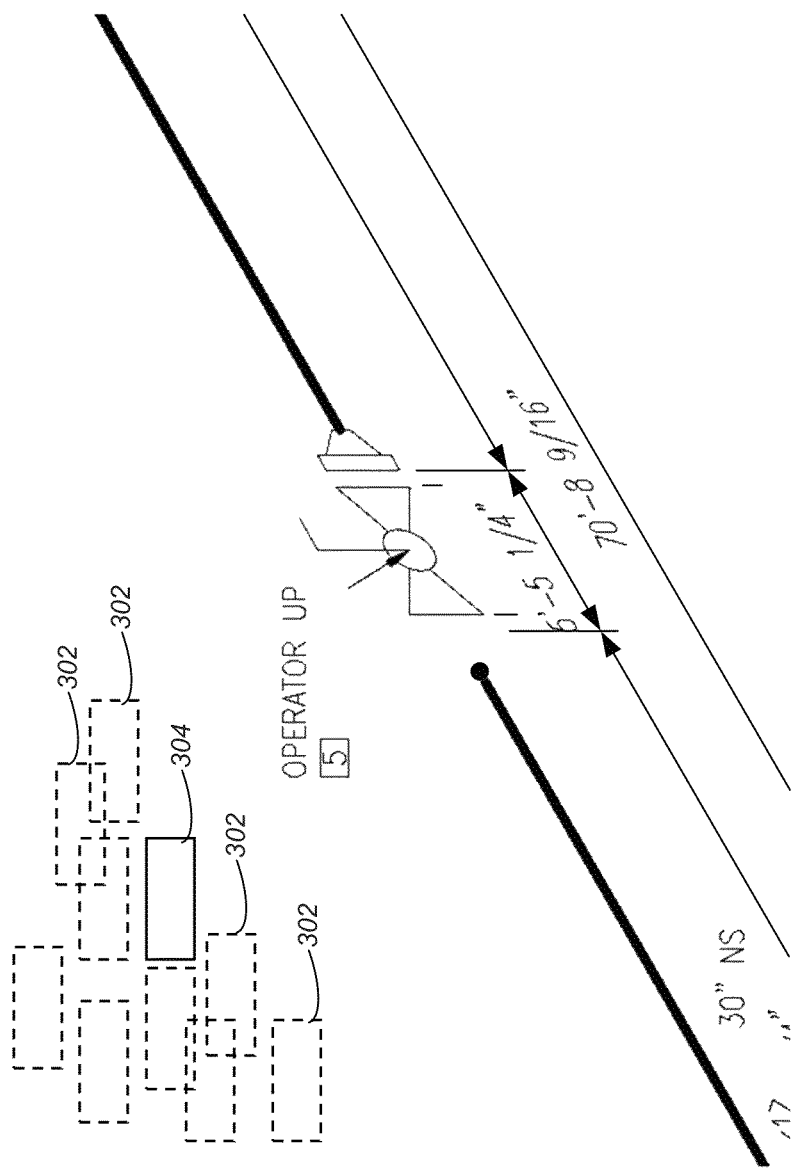
FIG. 3 illustrates possible locations for the annotation in accordance with one or more embodiments of the invention.

FIG. 3 illustrates possible locations for the annotation. The dashed rectangles 302 represent possible locations for the annotation within the solid rectangle 304. The possible placement locations are created for illustration purposes only and are not using the actual positions for the model.

Possible positions can be created along a pipeline or radiating out from an anchor point depending on the annotation type. When radiating out, an angle step is used that decreases with increasing distances. This lowers the number of possible solutions up close where the free space is limited while allowing more space to be searched when further away. In other words, the pool of pre-computed positions may be computed by performing radiating sweeps out from the anchor point. Each of the sweeps is performed at an increased step sweep distance and the pre-computed positions are located on the radiating sweep (i.e., on the circle having a radius at the step sweep distance) based on an angle step that decreases with increasing distances (i.e., larger radii) from the anchor point. Further the first radiating sweep may be conducted at a distance/radius from the anchor point based on a diagonal distance of a bounding box of the annotation.

Figure 4:
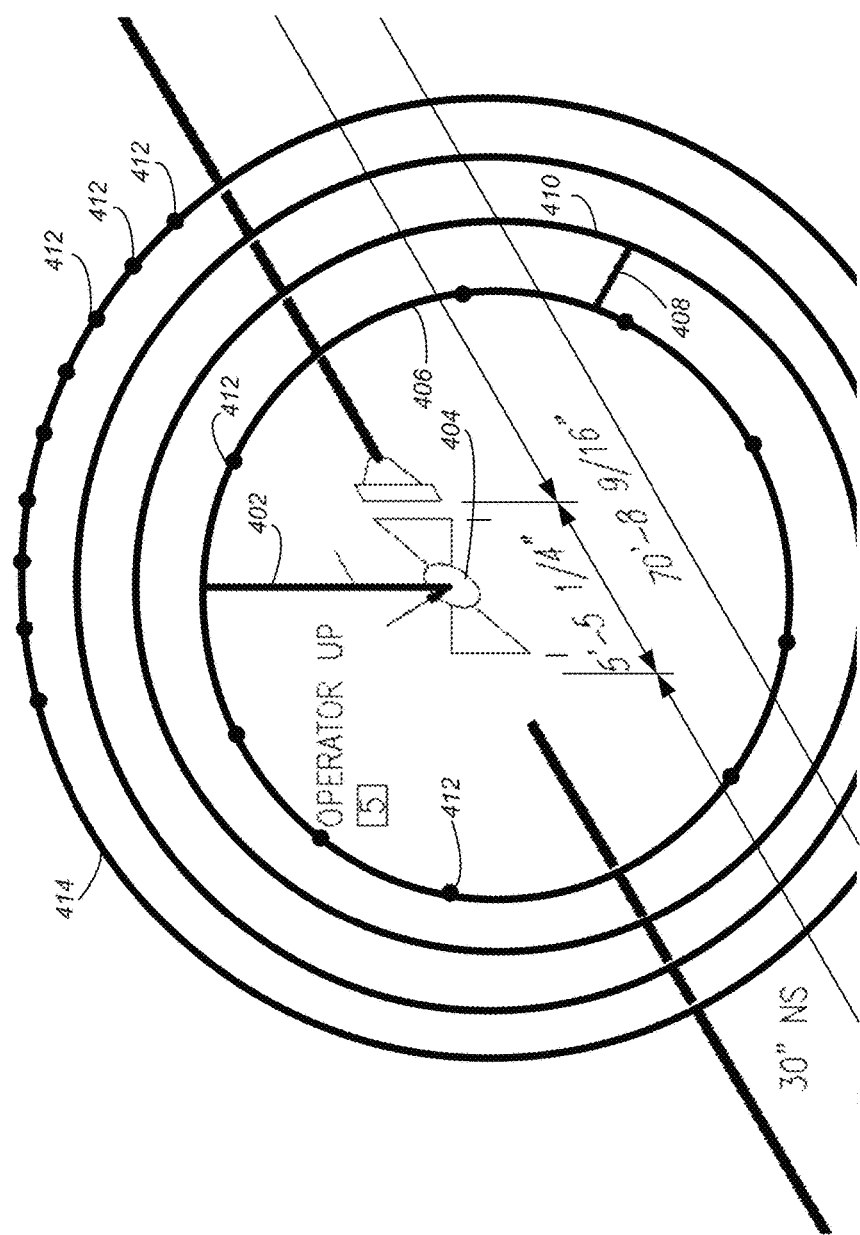
FIG. 4 illustrates an example of the calculation of placement locations in accordance with one or more embodiments of the invention.

In an exemplary embodiment, the possible placement for locations for an annotation are generated by sweeping 360 degrees around the component being annotated by up to four (4) different radius lengths away from the component. The radius is increased by a variable number of units (8 by default) (referred to herein as the step sweep distance) based on the annotation type. FIG. 4 illustrates an example of the calculation of placement locations in accordance with one or more embodiments of the invention.

The line 402 from the center of the component 404 to the inner circle 406 represents the "minimum" radius. The minimum radius is calculated using the diagonal distance of the annotation's bounding box. The line 408 between the inner circle 406 and the next larger circle 410 is the radius step/step sweep distance (e.g., 8 units by default). The dots 412 on the circles (e.g., circles 406 and 414) represent a location for the annotation to try. The angle step (from the component to the circle) decreases with distance. Notice that on the inner circle 406, the dots 412 are far apart. However, on the outer circle 414, the dots 412 are closer together. The angle step is computed using a very simple linear formula to be between 30 and 7.5 degrees.

In other words, to avoid a continuous set of locations, a step angle is used to determine the potential locations. When closer to the component, a larger step angle may be used (e.g., 30 degrees). However, as the distance from the component being annotated increases, the angle may decrease (e.g., down to 7.5 degrees). In one or more embodiments, while radiating out and determining placement locations, a maximum number of placement locations may be pre-defined/specified (e.g., 80 potential locations). Further, a maximum number of sweeps may also be specified (e.g., four sweeps or three for end connections, with steps in 8 unit/pixel increments).

Referring again to FIG. 4, a bounding box for the annotation is identified and a diagonal distance is determined. The diagonal distance is used as the minimum radius/distance 402 to be used to determine the first potential placement location. A radial sweep is conducted (based on the radius 402—creating circle 406). Potential locations on the circle 406 are identified every 30 degrees. Once the first sweep is complete, the process increases the radius by the radius step 408 (e.g., 8 units by default) and conducts a second sweep based on the increased radius (e.g., a sweep around circle 410). A different and smaller step angle is used as the radius increases. Additional sweeps at increasing radii (incremented by radius step 408) and decreasing angle steps are conducted until about four (4) sweeps are complete.

Different numbers of sweeps may be conducted based on the annotation. For example, if the annotation is very large, it will consume significant space, and with such a large minimum radius, only 3 sweeps may be conducted. In addition, a radial search to determine placement locations may also depend on the type of annotation. For example, if the annotation has a leader line, a radial sweep may be used to determine placement locations. However, if the annotation does not have a leader line (e.g., it may sit directly adjacent/on top of a component/line), an attempt may be made to place the annotation directly adjacent the component. If direct placement does not work, a radial search may then be conducted.

Before attempting to optimize the annotation placement, embodiments of the invention may select a "preferred" location as a starting point. As used herein, a preferred location may be defined as the minimum distance away from the component and the angle as close to perpendicular as possible. For example, in FIG. 4, the first placement location may be at the dot 412 just to the right of the perpendicular radius 402 extending from component 404. Once preferred annotation placement locations have been selected for each annotation, the optimization process may begin.

Quality Score

Step 208 of FIG. 2 computes the quality score of the resulting model once the annotation has been moved to the new location. The quality score of the model is computed by summing the cost of each annotation in the resulting model.

$$\text{Quality} = \Sigma_{x=1}^{n} f(x)$$

where n is the number of annotations in the model and $f(x)$ is the function that computes the cost of the $x^{th}$ annotation in the model.

Cost Function

The cost function $f(x)$ computes the quality of a single annotation placement by adding two values together: (1) priority; and (2) penalty.

Priority

Priority is used to break a tie between placements with the same penalty value. For example, if neither of two placement locations have a penalty (or the penalty values are equal), the priority is used to determine which placement location is preferred (i.e., the cost function is solely based on priority). Nonetheless, any penalty is often weighted more heavily than priority such that a less severe penalty for a placement location would usually override a placement location with higher priority.

In one or more embodiments, the priority is based on distance from the component/anchor point associated with the annotation being placed. For example, when performing radial sweeps to place an annotation, every time a sweep is performed, the placement location is further away from the component. Thus, placement locations that are closer to the component have higher priority over placement locations that are further away. As an example, a priority may start at zero (0) for the closest distance and increase thereafter.

Penalty

The penalty of an annotation placement quantifies the modeling violations detected based on a set of collision rules. In this regard, the set of collision (aka intersection) rules may be used to compute the penalty value.

A 2D grid of cells is created to represent the drawing model. Each cell tracks the objects that occupy it. Further, when establishing the 2D grid, each cell of the grid may have a particular property that is used to determine the penalty value (e.g., an exclusive area). The penalty is computed for each annotation in the drawing and summed together for the total quality score. In other words, the penalty value comprises the number of cells occupied by multiple objects, of a 2D grid representing the drawing model, for each model violation multiplied by a value associated with the respective type of modeling violation.

FIG. 5 illustrates an example visualization of a 2D grid in accordance with one or more embodiments of the invention. Cloud labels 502 explain the different types of components and areas as interpreted by embodiments of the invention.

The border 502 of the 2D grid represents drawable space. A penalty may be assigned to all annotations located outside of the drawable space 502. Exclusive area 504 identifies a region that cannot include any annotation. Thus, any annotation placed over a cell that is within an exclusive area 504 may be associated with a severe penalty. Annotation body 506 is the body/text of an annotation. Bumper 508 is the border/bumper area surrounding an annotation. A bumper region is used to provide a buffer area around an annotation so that annotations are not placed too close to each other. Leader 510 is the leader/line that connects the annotation with the component. Pipe component 512 is an exemplary component of a drawing. Dim main line 514 is a dimensioning line for identifying a dimension. Dim extension line 516 is a linear extension for a dimension between two points on the drawing. Not shown in the example is a skew and a "no component" that is used when a bare dimension is encountered or any other geometry that is not associated with a pipe or other component.

The penalty calculation computes/counts the number of overlapping cells and multiplies the number by the value associated with the respective violation. Using such a penalty calculation ensures that the annotation intersection depicted in FIG. 6A is considered better than/preferable to the annotation intersection depicted in FIG. 6B.

Exemplary penalty values that may be used in one or more embodiments are:

BumperWithBumper=13
AnnotationWithBumper=15
AnnotationWithNoComponentCell=30
AnnotationWithExclusiveCell=100
AnnotationBodyWithPipeComponent=35
AnnotationBodyWithAnnotationBody=32
AnnotationBodyWithLeader=22
AnnotationBodyWithDimension=28
AnnotationBodyWithDimensionExtension=23
AnnotationLeaderWithPipeComponent=30
AnnotationLeaderWithLeader=22
AnnotationLeaderWithDimension=28
AnnotationLeaderWithDimensionExtension=23
AnnotationWithSkew=30

As can be seen by the above penalty values, a conflict between two bumpers 508 has a penalty value of 13, while a conflict between an annotation and an exclusive cell has a greater penalty value of 100. In view of the above, a penalty is computed for each annotation in the drawing and summed together for a total quality score. As an example, if annotation A's body and annotation B's bumper share a single cell of the grid then each annotation (i.e., annotation A and annotation B) contributes 15 to the total quality of the drawing (or 30 combined). Accordingly, an ideal penalty score would be zero or as low as possible (i.e., no conflict/intersections occurred).

Since the 2D grid tracks the objects that occupy each cell, calculating the quality score on the next iteration may only include the following annotations:

The annotation that was moved;
The annotations that previously contributed to the moved annotation's penalty value; and
The annotations that now contribute to the moved annotation's penalty value at its new position.

A cache of penalty values may be used for all other annotations in the model.

In view of the above, cells that are occupied are marked and identified by the component that occupies the cell. All of the cells in the grid that are occupied by more than one object are counted and each cell is multiplied by the type of intersection (based on the penalty value above).

Acceptance or Rejection

Step 210 of FIG. 2 provides for either accepting or rejecting the resulting model after the annotation has been moved at step 206 and the quality score has been computed at step 208. In this regard, the change made to the model is either accepted or rejected based on the quality score as follows:

If the new quality score is less than the previous quality score, then the change is accepted;
If the new quality score is greater than the previous quality score, then a probability of acceptance is computed to determine if the change is to be accepted.

Referring to FIG. 2, on acceptance, at 212, the resulting model is passed to the next iteration (i.e., back at step 202), thus continuing the optimization process. If the change is rejected, at 214, the previous model is passed to the next iteration process.

Probability of Acceptance

As described above, if the new quality score is greater than the previous quality score, then a probability of acceptance is computed to determine if the change is to be accepted. Such a use of a probability of acceptance allows worse solutions to be accepted early on in order to optimize the annotation placement over the long term.

Some prior art techniques may utilize the concept of hill climbing which refers to the concept of finding a better solution by incrementally changing a single element of the solution; and if the change produces a better solution, an incremental change is made to the new solution, repeating until no further improvements can be found. However, such a hill climbing process may be good for finding a local optimum (a solution that cannot be improved by considering a neighboring configuration), but it is not necessarily guaranteed to find the best possible solution (the global optimum) out of all possible solutions.

In one or more embodiments of the invention, the probability of acceptance is based on a concept of simulated annealing. To allow simulated annealing to escape local maximums/optimums (a process that distinguishes simulated annealing from hill climbing), thus finding the global maximum, it may be necessary to at times, select a worse state. Thus, embodiments of the invention utilize a simulated annealing approach and allow acceptance of a worse state allowing a larger problem space to be searched while not neglecting the area near a global maximum/optimum.

Below is a snippet of code illustrating the simulated annealing process that may be used in accordance with one or more embodiments of the invention:

```
// Yes, sometimes allow a worse state to be selected. This is
// how a local maximum is escaped. When the temperature is
// high, the possibility is good that a worse solution may
// be tried. As the temperature cools, it is less and less
// probable to allow a major quality difference to be tried.
//
if (!bAccept && !stopper.IsDone( ))
{
    double probability = m_rnd.NextDouble( );
    double acceptance_ratio =
        Math.Exp(-cost / m_scheduler.Temperature);
    if (acceptance_ratio > probability)
    {
        bAccept = true;
    }
}
```

The "cost" variable is the difference in quality rating for the model before the annotation is moved and after. A positive cost is a worse score while a negative cost is an improvement to the model. If the cost is less, then it is accepted. If the cost is more, the sign on it is reversed, and divided by the current temperature and used as the power of e. The temperature is higher at the beginning and decreases with each iteration. Accordingly, as the temperature decreases, the probability/acceptance ratio also decreases. Thus, worse solutions are accepted with decreasing probability as the number of iterations increases.

The "m_scheduler.Temperature" variable is computed as follows:

$$m\_initial\_temperature * Math.Exp(-m\_cooling\_factor * (m\_current-1))$$

"m_initial_temperature" is currently set to 50,000 and can be changed by the user.

"m_cooling_factor" is currently set to 0.015 and can be changed by the user.

"m_current" is set to the current iteration number during the search.

The temperature is configurable and may be set to a particular value by the user. Based on the above process, a quality rating of the drawing/model is utilized and better and better quality drawings are accepted as the temperature decreases.

In view of the above, there are three variables that can be set to control the annealing process: the maximum number of iterations; the initial temperature; and lambda (also referred to as a cooling factor).

The maximum number of iterations provides a hard stop that overrides the temperature and other factors used to determine the number of iterations.

The initial temperature is the starting/beginning temperature.

The lambda is the cooling factor that determines how much the temperature decreases with each iteration.

An additional variable may also include a stop early number that determines a number of iterations that are performed without improvement before exiting. For example, if 1000 of the 5000 max iterations have been performed, but for the last 100 iterations no better solution is found, then the stop early number may allow the process to stop iterating without exhausting the 5000 max iterations. To implement such a stop early number, the number of consecutive rejected moves may be counted and once the number reaches 100, the iterations may cease.

In view of the above, the probability of acceptance consists of determining that the resulting model is accepted if an acceptance ratio is greater than a probability (i.e., acceptance_ratio>probability). The probability is a random number between 0 and 1, the acceptance_ratio is $e^{-cost/temp_{scheduler}}$, the cost is a difference between the new quality score and the previous quality score, $temp_{scheduler}=temp_{init}*e^{-coolingfactor*(iterationcount-1)}$, $temp_{init}$ is predefined, coolingfactor is predefined, and the iterationcount is a count of a current number of iterations.

Figure 1:
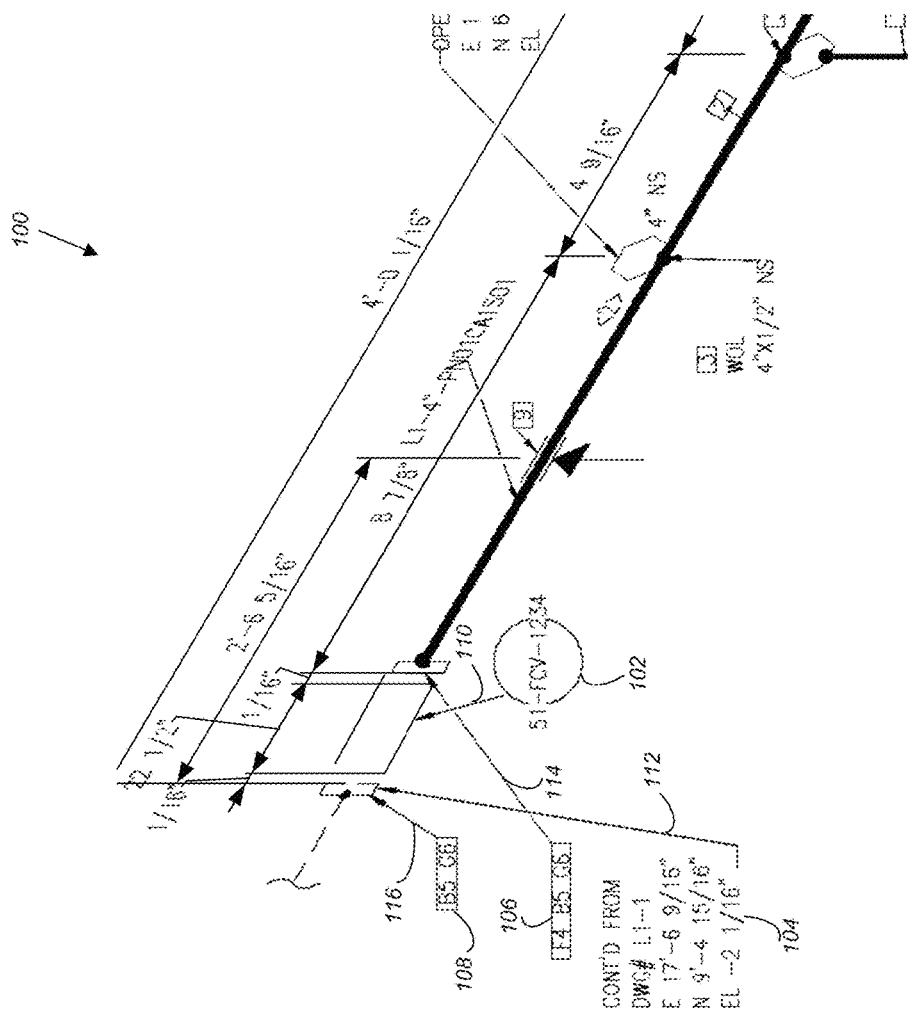
FIG. 1 illustrates the results of label placement using a greedy method in the prior art.
Figure 7:
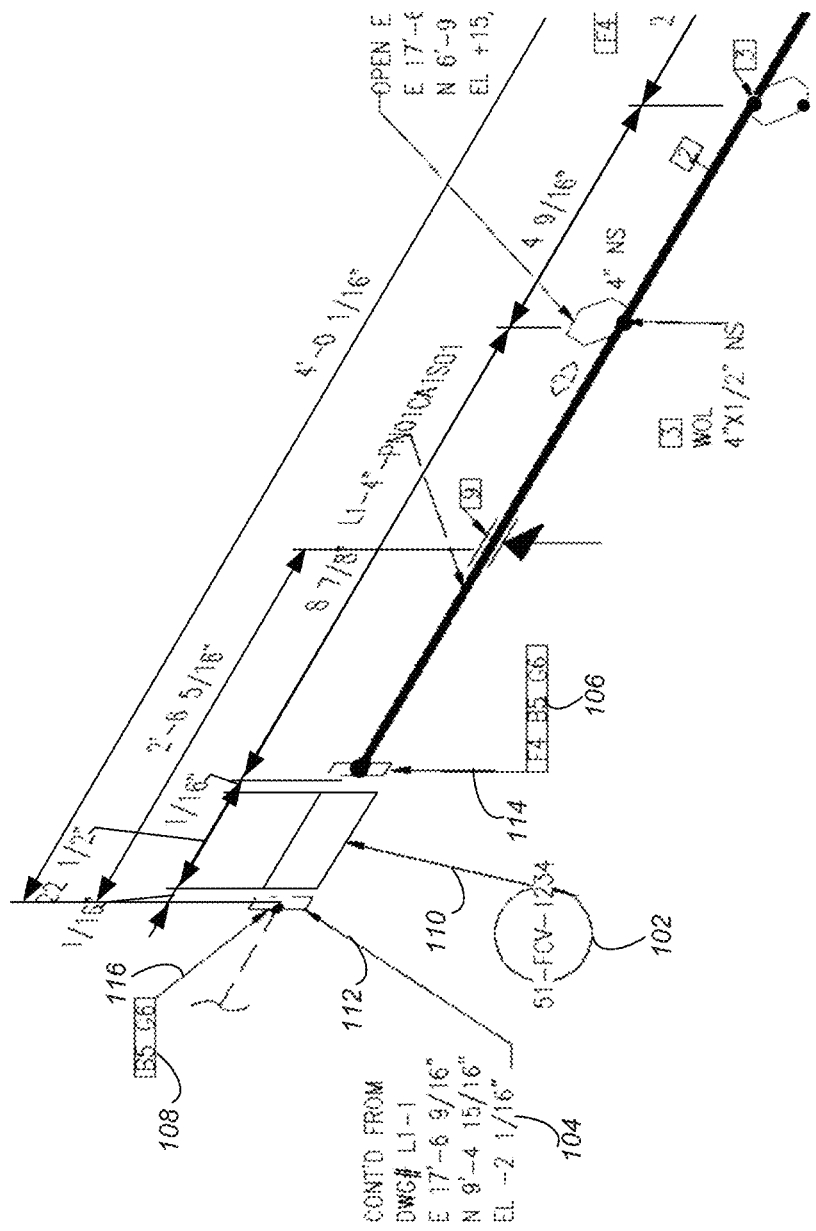
FIG. 7 illustrates exemplary results for optimizing annotation placement using the simulated annealing process in accordance with one or more embodiments of the invention.

FIG. 7 illustrates exemplary results for optimizing annotation placement using the simulated annealing process in accordance with one or more embodiments of the invention. One may note the differences between the greedy placement system illustrated in FIG. 1 with the results of FIG. 7 where leaders 110, 112, 114, and 116 do not cross each other, and the labels are placed in locations such that the leaders and labels do not conflict with existing components/dimensions.

Hardware Environment

Figure 8:
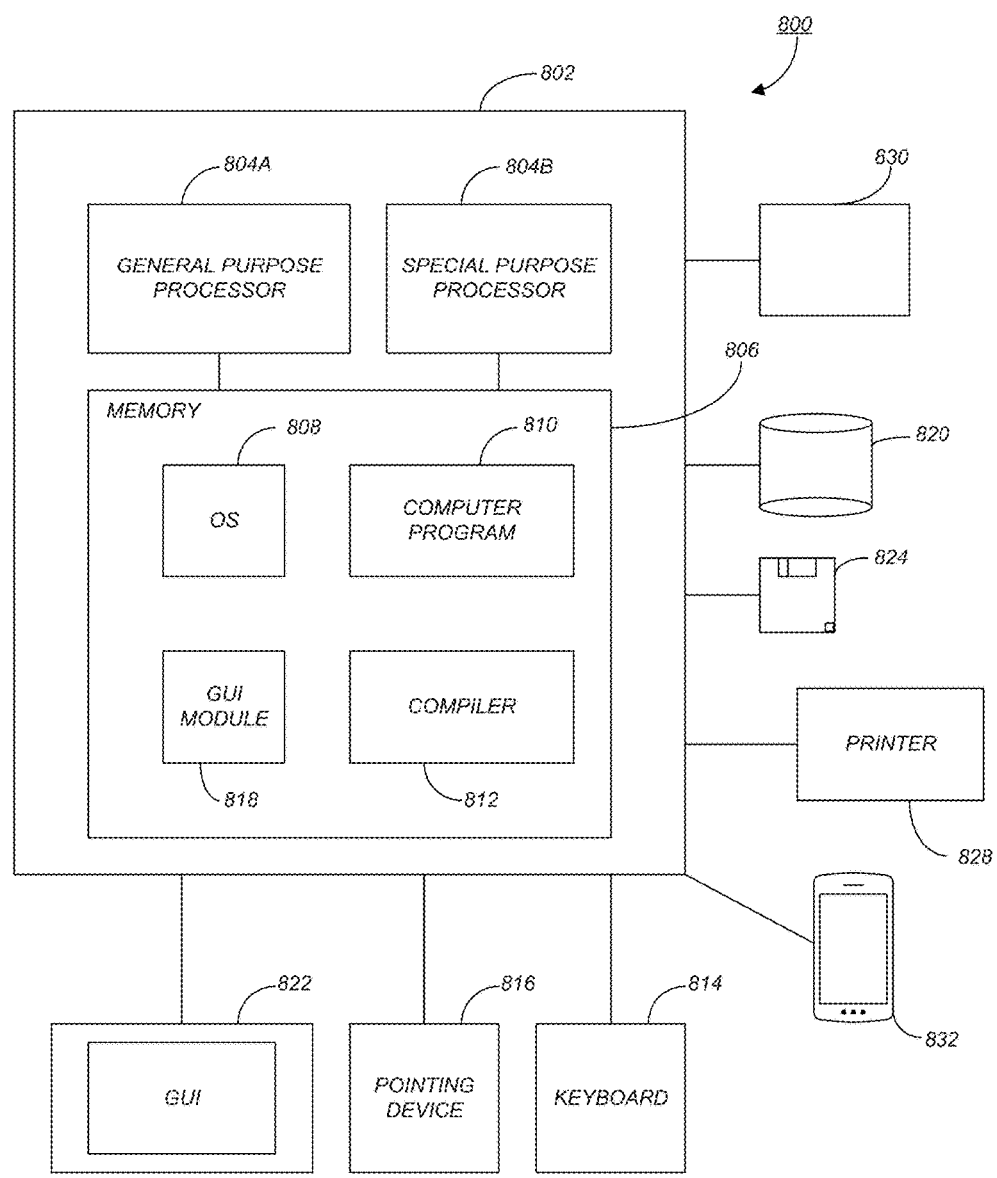
FIG. 8 is an exemplary hardware and software environment used to implement one or more embodiments of the invention.

FIG. 8 is an exemplary hardware and software environment 800 used to implement one or more embodiments of the invention. The hardware and software environment includes a computer 802 and may include peripherals. Computer 802 may be a user/client computer, server computer, or may be a database computer. The computer 802 comprises a general purpose hardware processor 804A and/or a special purpose hardware processor 804B (hereinafter alternatively collectively referred to as processor 804) and a memory 806, such as random access memory (RAM). The computer 802 may be coupled to, and/or integrated with, other devices, including input/output (I/O) devices such as a keyboard 814, a cursor control device 816 (e.g., a mouse, a pointing device, pen and tablet, touch screen, multi-touch device, etc.) and a printer 828. In one or more embodiments, computer 802 may be coupled to, or may comprise, a portable or media viewing/listening device 832 (e.g., an MP3 player, IPOD, NOOK, portable digital video player, cellular device, personal digital assistant, etc.). In yet another embodiment, the computer 802 may comprise a multi-touch device, mobile phone, gaming system, internet enabled television, television set top box, or other internet enabled device executing on various platforms and operating systems.

In one embodiment, the computer 802 operates by the general purpose processor 804A performing instructions defined by the computer program 810 (e.g., an optimization application) under control of an operating system 808. The computer program 810 and/or the operating system 808 may be stored in the memory 806 and may interface with the user and/or other devices to accept input and commands and, based on such input and commands and the instructions defined by the computer program 810 and operating system 808, to provide output and results.

Output/results may be presented on the display 822 or provided to another device for presentation or further processing or action. In one embodiment, the display 822 comprises a liquid crystal display (LCD) having a plurality of separately addressable liquid crystals. Alternatively, the display 822 may comprise a light emitting diode (LED) display having clusters of red, green and blue diodes driven together to form full-color pixels. Each liquid crystal or pixel of the display 822 changes to an opaque or translucent state to form a part of the image on the display in response to the data or information generated by the processor 804 from the application of the instructions of the computer program 810 and/or operating system 808 to the input and commands. The image may be provided through a graphical user interface (GUI) module 818. Although the GUI module 818 is depicted as a separate module, the instructions performing the GUI functions can be resident or distributed in the operating system 808, the computer program 810, or implemented with special purpose memory and processors.

In one or more embodiments, the display 822 is integrated with/into the computer 802 and comprises a multi-touch device having a touch sensing surface (e.g., track pod or touch screen) with the ability to recognize the presence of two or more points of contact with the surface. Examples of multi-touch devices include mobile devices (e.g., IPHONE, NEXUS S, DROID devices, etc.), tablet computers (e.g., IPAD, HP TOUCHPAD), portable/handheld game/music/video player/console devices (e.g., IPOD TOUCH, MP3 players, NINTENDO 3DS, PLAYSTATION PORTABLE, etc.), touch tables, and walls (e.g., where an image is projected through acrylic and/or glass, and the image is then backlit with LEDs).

Some or all of the operations performed by the computer 802 according to the computer program 810 instructions may be implemented in a special purpose processor 804B. In this embodiment, the some or all of the computer program 810 instructions may be implemented via firmware instructions stored in a read only memory (ROM), a programmable read only memory (PROM) or flash memory within the special purpose processor 804B or in memory 806. The special purpose processor 804B may also be hardwired through circuit design to perform some or all of the operations to implement the present invention. Further, the special purpose processor 804B may be a hybrid processor, which includes dedicated circuitry for performing a subset of functions, and other circuits for performing more general functions such as responding to computer program 810 instructions. In one embodiment, the special purpose processor 804B is an application specific integrated circuit (ASIC).

The computer 802 may also implement a compiler 812 that allows an application or computer program 810 written in a programming language such as C, C++, Assembly, SQL, PYTHON, PROLOG, MATLAB, RUBY, RAILS, HASKELL, or other language to be translated into processor 804 readable code. Alternatively, the compiler 812 may be an interpreter that executes instructions/source code directly, translates source code into an intermediate representation that is executed, or that executes stored precompiled code. Such source code may be written in a variety of programming languages such as JAVA, JAVASCRIPT, PERL, BASIC, etc. After completion, the application or computer program 810 accesses and manipulates data accepted from I/O devices and stored in the memory 806 of the computer 802 using the relationships and logic that were generated using the compiler 812.

The computer 802 also optionally comprises an external communication device such as a modem, satellite link, Ethernet card, or other device for accepting input from, and providing output to, other computers 802.

In one embodiment, instructions implementing the operating system 808, the computer program 810, and the compiler 812 are tangibly embodied in a non-transitory computer-readable medium, e.g., data storage device 820, which could include one or more fixed or removable data storage devices, such as a zip drive, floppy disc drive 824, hard drive, CD-ROM drive, tape drive, etc. Further, the operating system 808 and the computer program 810 are comprised of computer program 810 instructions which, when accessed, read and executed by the computer 802, cause the computer 802 to perform the steps necessary to implement and/or use the present invention or to load the program of instructions into a memory 806, thus creating a special purpose data structure causing the computer 802 to operate as a specially programmed computer executing the method steps described herein. Computer program 810 and/or operating instructions may also be tangibly embodied in memory 806 and/or data communications devices 830, thereby making a computer program product or article of manufacture according to the invention. As such, the terms "article of manufacture," "program storage device," and "computer program product," as used herein, are intended to encompass a computer program accessible from any computer readable device or media.

Of course, those skilled in the art will recognize that any combination of the above components, or any number of different components, peripherals, and other devices, may be used with the computer 802.

Figure 9:
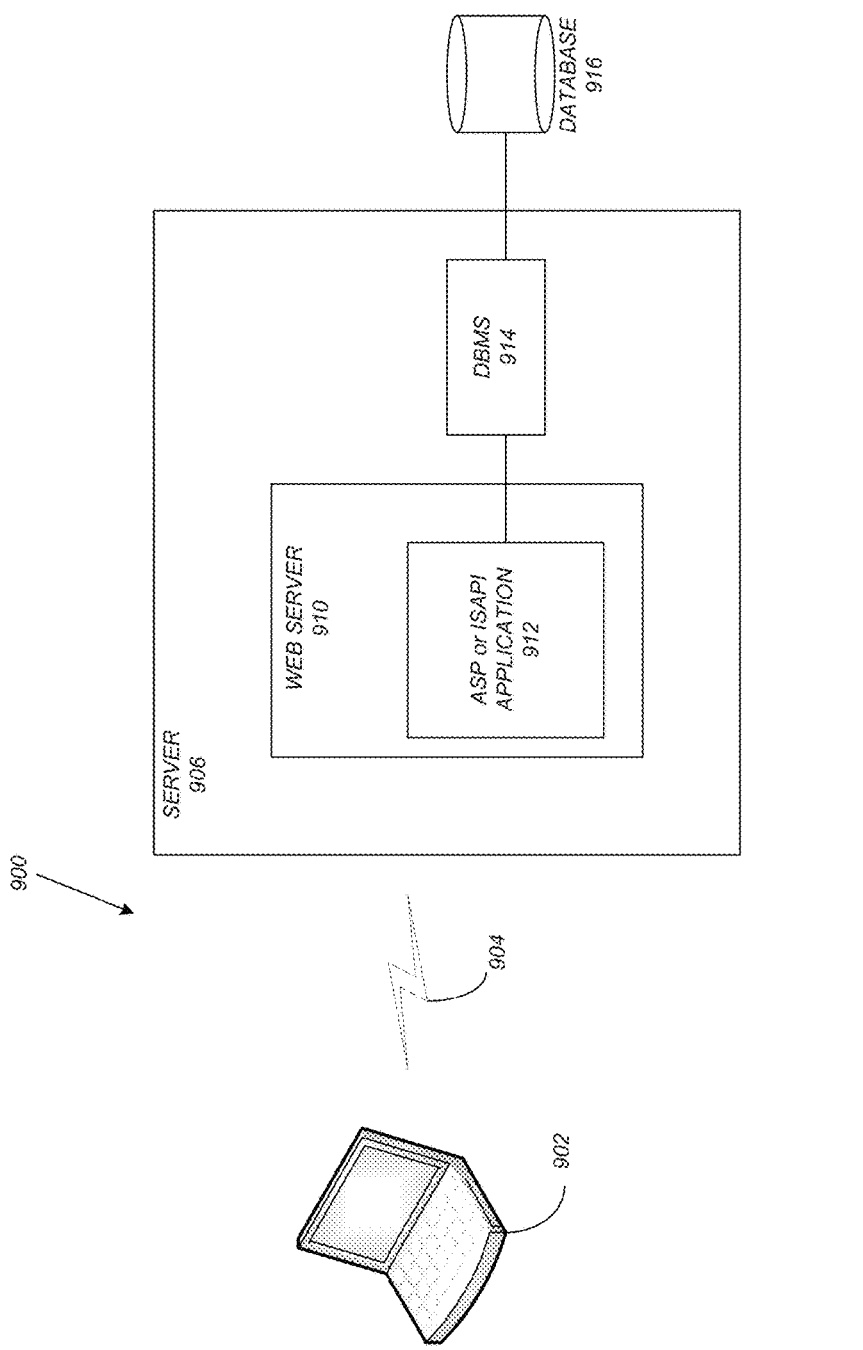
FIG. 9 schematically illustrates a typical distributed/cloud-based computer system using a network to connect client computers to server computers in accordance with one or more embodiments of the invention.

FIG. 9 schematically illustrates a typical distributed/cloud-based computer system 900 using a network 904 to connect client computers 902 to server computers 906. A typical combination of resources may include a network 904 comprising the Internet, LANs (local area networks), WANs (wide area networks), SNA (systems network architecture) networks, or the like, clients 902 that are personal computers or workstations (as set forth in FIG. 8), and servers 906 that are personal computers, workstations, minicomputers, or mainframes (as set forth in FIG. 8). However, it may be noted that different networks such as a cellular network (e.g., GSM [global system for mobile communications] or otherwise), a satellite based network, or any other type of network may be used to connect clients 902 and servers 906 in accordance with embodiments of the invention.

A network 904 such as the Internet connects clients 902 to server computers 906. Network 904 may utilize ethernet, coaxial cable, wireless communications, radio frequency (RF), etc. to connect and provide the communication between clients 902 and servers 906. Further, in a cloud-based computing system, resources (e.g., storage, processors, applications, memory, infrastructure, etc.) in clients 902 and server computers 906 may be shared by clients 902, server computers 906, and users across one or more networks. Resources may be shared by multiple users and can be dynamically reallocated per demand. In this regard, cloud computing may be referred to as a model for enabling access to a shared pool of configurable computing resources.

Clients 902 may execute a client application or web browser and communicate with server computers 906 executing web servers 910. Such a web browser is typically a program such as MICROSOFT INTERNET EXPLORER, MOZILLA FIREFOX, OPERA, APPLE SAFARI, GOOGLE CHROME, etc. Further, the software executing on clients 902 may be downloaded from server computer 906 to client computers 902 and installed as a plug-in or ACTIVEX control of a web browser. Accordingly, clients 902 may utilize ACTIVEX components/component object model (COM) or distributed COM (DCOM) components to provide a user interface on a display of client 902. The web server 910 is typically a program such as MICROSOFT'S INTERNET INFORMATION SERVER.

Web server 910 may host an Active Server Page (ASP) or Internet Server Application Programming Interface (ISAPI) application 912, which may be executing scripts. The scripts invoke objects that execute business logic (referred to as business objects). The business objects then manipulate data in database 916 through a database management system (DBMS) 914. Alternatively, database 916 may be part of, or connected directly to, client 902 instead of communicating/obtaining the information from database 916 across network 904. When a developer encapsulates the business functionality into objects, the system may be referred to as a component object model (COM) system. Accordingly, the scripts executing on web server 910 (and/or application 912) invoke COM objects that implement the business logic. Further, server 906 may utilize MICROSOFT'S TRANSACTION SERVER (MTS) to access required data stored in database 916 via an interface such as ADO (Active Data Objects), OLE DB (Object Linking and Embedding DataBase), or ODBC (Open DataBase Connectivity).

Generally, these components 900-916 all comprise logic and/or data that is embodied in/or retrievable from device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

Although the terms "user computer", "client computer", and/or "server computer" are referred to herein, it is understood that such computers 902 and 906 may be interchangeable and may further include thin client devices with limited or full processing capabilities, portable devices such as cell phones, notebook computers, pocket computers, multi-touch devices, and/or any other devices with suitable processing, communication, and input/output capability.

Of course, those skilled in the art will recognize that any combination of the above components, or any number of different components, peripherals, and other devices, may be used with computers 902 and 906. Embodiments of the invention are implemented as a software application on a client 902 or server computer 906. Further, as described above, the client 902 or server computer 906 may comprise a thin client device or a portable device that has a multi-touch-based display.

CONCLUSION

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

In summary, embodiments of the invention provide for using a simulated annealing optimization strategy that allows an application to consider multiple placements for an annotation, accepting those that yield better and better results as the software runs over time, using rules that quantify the quality of the solution.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method for optimizing placement of annotations in a drawing model, comprising:
   randomly selecting an annotation, in the drawing model, to move;
   randomly selecting a new position for the selected annotation, wherein the new position is randomly selected from a pool of new positions, and wherein the new positions in the pool are dependent on a type of the selected annotation;
   moving the selected annotation to the new position;
   computing a new quality score of a resulting drawing model, wherein the computing comprises summing a cost of each annotation in the resulting model, and wherein the cost is based on a two-dimensional (2D) grid representing the drawing model, and wherein the cost includes a penalty value that is based on a number of cells of the 2D grid that are occupied by multiple annotations;
   accepting or rejecting the resulting drawing model based on the new quality score;
   iterating all the above steps, wherein over time, a probability of accepting the resulting drawing model based on a worse new quality score decreases; and
   displaying the resulting drawing model.

2. The computer-implemented method of claim 1, wherein the new positions in the pool comprise pre-computed positions.

3. The computer-implemented method of claim 2, further comprising:
   generating the pool of pre-computed positions;
   assigning each of the pre-computed positions, in the pool, a priority based on distance from an anchor point of the annotation, wherein a pre-computed position closer to the anchor point is preferred over pre-computed positions further away.

4. The computer-implemented method of claim 2, further comprising:
   generating the pool of pre-computed positions by performing radiating sweeps out from the anchor point, wherein:
      each of the radiating sweeps is performed at an increased step sweep distance; and
      the pre-computed locations are located on the radiating sweep based on an angle step that decreases with increasing distances from the anchor point.

5. The computer-implemented method of claim 4, wherein:
a first of the radiating sweeps is conducted at a distance from the anchor point based on a diagonal distance of a bounding box of the annotation.

6. The computer-implemented method of claim 1, wherein:
the cost of each annotation comprises a sum of a priority value and the penalty value;
the priority value is based on a distance from the anchor point;
the priority value is used to break a tie between placements with a same penalty value; and
the penalty value quantifies modeling violations detected based on a set of collision rules.

7. The computer-implemented method of claim 6, wherein:
the penalty value comprises the number of cells occupied by multiple annotations for each model violation, multiplied by a value associated with the respective type of modeling violation.

8. The computer-implemented method of claim 1, wherein:
if the new quality score is less than a previous quality score, then the resulting model is accepted; and
if the new quality score is greater than the previous quality score, then a probability of acceptance is computed to determine if the resulting model is accepted.

9. The computer-implemented method of claim 8, wherein the probability of acceptance comprises:
determining that the resulting model is accepted if an acceptance ratio is greater than a probability (acceptance_ratio >probability), wherein:
the probability comprises a random number between 0 and 1;
the acceptance_ratio $=e^{-cost/temp_{scheduler}}$;
the cost is a difference between the new quality score and the previous quality score;
$temp_{scheduler} = temp_{init} * e^{-cooling\,factor\,*\,(iterationcount-1)}$;
$temp_{init}$ is a predefined number;
coolingfactor is a predefined number; and
iterationcount is a count of a current number of iterations.

10. A computer system for optimizing placement of annotations in a drawing model comprising:
(a) a computer having a memory;
(b) an optimization application executing on the computer, wherein the optimization application:
acquires a drawing model comprising multiple annotations and objects;
(ii) randomly selects an annotation, in the drawing model, to move;
(iii) randomly selects a new position for the selected annotation, wherein the new position is randomly selected from a pool of new positions, and wherein the new positions in the pool are dependent on a type of the selected annotation;
(iv) moves the selected annotation to the new position;
(v) computes a new quality score of a resulting drawing model, wherein the new quality score is computed by summing a cost of each annotation in the resulting model, and wherein the cost is based on a two-dimensional (2D) grid representing the drawing model, and wherein the cost includes a penalty value that is based on a number of cells of the 2D grid that are occupied by multiple annotations;

(vi) accepts or rejects the resulting drawing model based on the new quality score; and
(vii) iterates all the above steps, wherein over time, a probability of accepting the resulting drawing model based on a worse new quality score decreases; and
(c) a display communicatively coupled to the computer that displays the resulting drawing model.

11. The computer system of claim 10, wherein the new positions comprise pre-computed positions.

12. The computer system of claim 11, wherein the optimization application:
generates the pool of pre-computed positions;
assigns each of the pre-computed positions, in the pool, a priority based on distance from an anchor point of the annotation, wherein a pre-computed position closer to the anchor point is preferred over pre-computed positions further away.

13. The computer system of claim 11, wherein the optimization application:
generates the pool of pre-computed positions by performing radiating sweeps out from the anchor point, wherein:
each of the radiating sweeps is performed at an increased step sweep distance; and
the pre-computed locations are located on the radiating sweep based on an angle step that decreases with increasing distances from the anchor point.

14. The computer system of claim 13, wherein:
a first of the radiating sweeps is conducted at a distance from the anchor point based on a diagonal distance of a bounding box of the annotation.

15. The computer system of claim 10, wherein:
the cost of each annotation comprises a sum of a priority value and the penalty value;
the priority value is based on a distance from the anchor point;
the priority value is used to break a tie between placements with a same penalty value; and
the penalty value quantifies modeling violations detected based on a set of collision rules.

16. The computer system of claim 15, wherein:
the penalty value comprises the number of cells occupied by multiple annotations for each model violation, multiplied by a value associated with the respective type of modeling violation.

17. The computer system of claim 10, wherein:
if the new quality score is less than a previous quality score, then the resulting model is accepted; and
if the new quality score is greater than the previous quality score, then a probability of acceptance is computed to determine if the resulting model is accepted.

18. The computer system of claim 17, wherein the probability of acceptance comprises:
determining that the resulting model is accepted if an acceptance ratio is greater than a probability (acceptance_ratio >probability), wherein:
the probability comprises a random number between 0 and 1;
the acceptance_ratio $=e^{-cost/temp_{scheduler}}$;
the cost is a difference between the new quality score and the previous quality score;
$temp_{scheduler} = temp_{init} * e^{-cooling\,factor\,*\,(iterationcount-1)}$;
$temp_{init}$ is a predefined number;
coolingfactor is a predefined number; and iterationcount is a count of a current number of iterations.

\* \* \* \* \*